(12) United States Patent
Ahmed et al.

(10) Patent No.: US 11,430,151 B2
(45) Date of Patent: Aug. 30, 2022

(54) ONLINE LEARNING FOR 3D POSE ESTIMATION USING SIMPLIFIED CONSTELLATIONS

(71) Applicant: SEIKO EPSON CORPORATION, Tokyo (JP)

(72) Inventors: Mirza Tahir Ahmed, Vaughan (CA); Yan He, Toronto (CA); Dibyendu Mukherjee, Scarborough (CA)

(73) Assignee: SEIKO EPSON CORPORATION, Tokyo (JP)

(*) Notice: Subject to any disclaimer, the term of this patent is extended or adjusted under 35 U.S.C. 154(b) by 20 days.

(21) Appl. No.: 16/927,608

(22) Filed: Jul. 13, 2020

(65) Prior Publication Data

US 2021/0134007 A1    May 6, 2021

Related U.S. Application Data

(60) Provisional application No. 62/931,372, filed on Nov. 6, 2019.

(51) Int. Cl.
*G06T 7/73* (2017.01)
*G06V 10/44* (2022.01)
*G06V 10/75* (2022.01)

(52) U.S. Cl.
CPC ........... *G06T 7/74* (2017.01); *G06V 10/44* (2022.01); *G06V 10/751* (2022.01); *G06T 2207/10016* (2013.01); *G06T 2207/20081* (2013.01)

(58) Field of Classification Search
CPC ............ G06K 9/00624; G06K 9/4604; G06K 9/6202; G06K 9/6211; G06K 9/6215; G06K 9/6256; G06T 2207/10016; G06T 2207/20081; G06T 7/251; G06T 7/74; G06T 7/75
See application file for complete search history.

(56) References Cited

U.S. PATENT DOCUMENTS

| 8,655,029 | B2 | 2/2014 | Shiell et al. |
| 10,628,964 | B2 | 4/2020 | Szeto et al. |
| 2014/0168268 | A1 | 6/2014 | Oi et al. |

(Continued)

OTHER PUBLICATIONS

Damen et al.; "Real-time Learning and Detection of 3D Texture-less Objects: A Scalable Approach;" University of Bristol, UK; National Electronics Computer Technology Center, Bangkok, Thailand; 2012; pp. 1-12.

(Continued)

*Primary Examiner* — Ian L Lemieux
(74) *Attorney, Agent, or Firm* — Oliff PLC

(57) ABSTRACT

A non-transitory computer readable medium storing instructions to cause one or more processors to acquire an image data sequence containing images of an object in a scene along time and track a pose of the object through an object pose tracking algorithm. The processor may further, acquire a first pose of the object in a first image of the image data sequence, the first pose being a result of tracking a pose of the object through an object pose tracking algorithm, verify the first pose, extract 2D features of the object from the first image when the first pose is verified, and store a training dataset containing the extracted 2D features and the corresponding verified first pose in the one or more memories or other one or more memories.

15 Claims, 11 Drawing Sheets

(56) References Cited

U.S. PATENT DOCUMENTS

| | | | |
|---|---|---|---|
| 2014/0313228 A1 | 10/2014 | Kasahara | |
| 2015/0243031 A1* | 8/2015 | Narasimha | G06K 9/6256 |
| | | | 382/103 |
| 2016/0086017 A1 | 3/2016 | Rodriguez et al. | |
| 2018/0284802 A1* | 10/2018 | Tsai | G06K 9/6215 |
| 2019/0197196 A1* | 6/2019 | Yang | G06F 30/00 |
| 2020/0074672 A1* | 3/2020 | Hoff | G06T 19/006 |
| 2020/0348138 A1* | 11/2020 | Le | G01C 21/165 |

OTHER PUBLICATIONS

Chan et. al.; "Real-Time Texture-less Object Recognition on Mobile Devices;" 24th International Conference on Pattern Recognition; Aug. 20-24, 2018; pp. 3273-3278.

Chan et. al.; "Robust and Efficient Techniques for Texture-less Object Recognition;" IEEE; 2018.

Lin et. al.; "Focal Loss for Dense Object Detection;" IEEE International Conference on Computer Vision; 2017; pp. 2999-3007.

Balntas et. al.; "BOLD—Binary Online Learned Descriptor for Efficient Image Matching;" University of Surrey, UK; 2015; pp. 2367-2375.

Villamizar et. al.; "Online Human-Assisted Learning using Random Ferns;" 21st International Conference on Pattern Recognition; Nov. 11-15, 2012; pp. 2821-2824.

Özuysal et. al.; "Fast Keypoint Recognition Using Random Ferns;" IEEE Transactions On Pattern Analysis And Machine Intelligence; vol. 32, No. 3; Mar. 2010; pp. 448-161.

Zakharov et. al.; "3D Object Instance Recognition and Pose Estimation Using Triplet Loss with Dynamic Margin;" Apr. 9, 2019.

Collier et. al.; "Autonomous Navigation and Mapping in GPS-Denied Environments at Defence R&D Canada."; "NATO Unclassified"; pp. 1-12; Jan. 2012.

Sep. 19, 2019 Office Action issued in U.S. Appl. No. 16/135,800.

U.S. Appl. No. 16/886,183, filed May 28, 2020 in the name of Mukherjee et al.

Feb. 9, 2022 Office Action issued in U.S. Appl. No. 16/886,183.

Parihar et al., "Point Based Features for Contact-less Palmprint Images,", pp. 165-170, IEEE, 2013.

Jul. 1, 2022 Office Action issued In U.S. Appl. No. 16/886,183.

\* cited by examiner

ONLINE LEARNING FOR 3D POSE ESTIMATION USING SIMPLIFIED CONSTELLATIONS

CROSS-REFERENCE TO RELATED APPLICATIONS

This disclosure claims priority to provisional application 62/931,372, filed Nov. 6, 2019, the entire disclosure of which is hereby incorporated by reference in its entirety.

BACKGROUND

This disclosure relates generally to a field of pose estimation, and more specifically to methods and systems for 3D pose estimation for use in a device in an online training arrangement.

Three-dimensional (3D) pose estimation and six degrees of freedom (DoF) tracking have applications ranging from robotic vision and manufacturing to augmented reality. However, such training, particularly in an offline training regimen which includes training but no active object detection, has a variety of challenges. First, a large amount of training data is required with an accurate 6 DoF ground-truth, particularly when a wide view-range must be covered. That is, offline training is limited by the availability of ground-truth training data for object detection and pose estimation in a wide azimuth and elevation view-range. Once the object is trained in the limited view-range in an offline training, it can only be detected within that view range. Using tracking algorithms, objects can be tracked out of the trained view-range, but when the object is lost out of the trained view-range, it cannot be redetected unless it comes back into the trained view-range. Second, a training time and hardware may cause difficulty, especially when cloud-based services or high-end graphics processing units are unavailable. Third, inference time for object detection and pose estimation may be high for mobile hardware. Such challenges have been seen in, for example, template matching and feature detection based matching, especially when a wide view-range is considered.

SUMMARY

In general template matching, where, predefined templates to match a query image to the best training sample are used, there are often challenges due to speed issues, especially when pose estimation is extended to the full view sphere. Moreover, these methods often provide a rough pose, due to the discretization of the view sphere into different templates. Some techniques use depth modality in addition to RGB, which additionally require an active sensor.

In keypoint-based techniques, descriptor-matching to match points on an image to points on a 3D model, which can then be used to align the model and get an accurate pose, are used. In these methods, keypoint descriptors such as SIFT, SURF and ORB, are learned and may be matched with points on a CAD model. Pose estimation can then be done with techniques such as perspective n-point (PnP). However, extraction and matching of descriptors is computationally quite expensive, especially with increased view-range, and the methods also reduce capability to learn all views without confusion. These methods are often unusable for online training and inference. Lastly, accurate descriptors such as SIFT, are often unsuitable for low-feature objects where unique keypoints are very hard to find.

Further, these and other types of offline training approaches are not readily applicable to many practical tasks. For example, deep networks require large amounts of training data, which is difficult to gather or generate. Further, if synthetic data is used, an additional difficulty of transferring to a domain with real images may be encountered.

Additionally, generalizing offline training results to many objects is often difficult unless a separate model is generated for each object, which has an increase complexity and computational need. Further, the complexity of these models makes it difficult to detect in real-time, particularly in situations such as for augmented reality headsets or other computationally limited applications.

In view of the limitations of offline training for object detection and pose estimation, online training for object detection and pose estimation during six DoF object tracking has been studied. Online training, also referred to as online learning, or "on-the-fly training," for object detection after a six DoF tracking initiates, can, if effective, help lower a burden of detection from a wide-view range, and may also help increase a view range while the object is being tracked from unknown viewpoints. Re-detection from a larger view range can also be enabled. Thus, maximizing efficiency and accuracy in an online training environment for object detection and pose estimation is desirable.

While online training can provide a certain amount of relaxation because the training and inference environments are close to identical because object detection and pose estimation is invoked only during a tracking loss, online training has known difficulties. First, online training requires an extremely fast processing given that it involves actually actively detecting and tracking an object. Second, the training should support a wide view range for object detection and pose estimation and meet the challenges of fast inference. Third, particularly in mobile devices, memory consumption with online learning needs to be limited given storage capacity. Thus, training redundancy should be minimized. Further, a technique that is robust enough to not only train untrained views while tracking on runtime, but also detect the object when it is lost out of the trained view-range is desirable.

Additionally, other methods for online learning may not be particularly accurate or efficient, particularly when dealing with texture-less or weakly textured objects. A detection using edges, which are a consistent feature for texture-less or weakly textured objects, is desirable.

An advantage of some aspects of the disclosure is to solve at least a part of the problems described above, and aspects of the disclosure can be implemented as the following aspects.

One aspect of this disclosure is a non-transitory computer readable medium storing instructions to cause one or more processors to acquire, from a camera or one or more memory storing an image data sequence captured by the camera, the image data sequence containing images of an object in a scene along time. The processor may further track a pose of the object through an object pose tracking algorithm. Further, during the tracking of the pose of the object, the processor may acquire a first pose of the object in a first image of the image data sequence from, the first pose being a result of tracking a pose of the object through an object pose tracking algorithm. The processor may still further, during the tracking of the pose of the object, extract 2D features of the object from the first image, and also store a training dataset containing the extracted 2D features and the corresponding first pose in the one or more memories or other one or more memories.

Another aspect of this disclosure is a non-transitory computer readable medium storing instructions to cause one or more processors to acquire, from a camera or one or more memory storing an image data sequence captured by the camera, the image data sequence containing images of an object in a scene along time is disclosed. The processor may further acquire a first pose of the object in a first image of the image data sequence, the first pose being a result of tracking a pose of the object through an object pose tracking algorithm, verify the first pose, extract 2D features of the object from the first image when the first pose is verified, and store a training dataset containing the extracted 2D features and the corresponding verified first pose in the one or more memories or other one or more memories.

Another aspect of this disclosure is a method that includes acquiring from a camera or one or more memory storing an image data sequence captured by the camera, the image data sequence containing images of an object in a scene along time is disclosed. The method may further include acquiring a first pose of the object in a first image of the image data sequence, the first pose being a result of tracking a pose of the object through an object pose tracking algorithm. The method may further include verifying the first pose, extract 2D features of the object from the first image when the first pose is verified, and storing a training dataset containing the extracted 2D features and the corresponding verified first pose in the one or more memories or other one or more memories.

BRIEF DESCRIPTION OF THE DRAWINGS

The disclosure will be described with reference to the accompanying drawings, wherein like numbers reference like elements.

DETAILED DESCRIPTION OF EMBODIMENTS

The methods and instructions described herein may be implemented on any suitable device or system that includes a camera and a display. Such suitable devices may include, for example, a mobile phone, a tablet computer, a desktop computer (with a camera), a smart watch, a digital camera, an extended reality (XR) headset (e.g., a transparent HMD), or the like. All such suitable devices may be referred to generally as an XR device. Embodiments of the instant disclosure will be described with reference to an HMD, but as noted above the methods may be implemented, with appropriate modification, on any suitable device or system that includes a camera and a display. Moreover, examples will be described herein with reference to augmented reality (AR), but the methods may be implemented, with appropriate modification, in virtual reality (VR), mixed reality (MR), or any other XR system.

Configuration of Head Mounted Display

Figure 1:
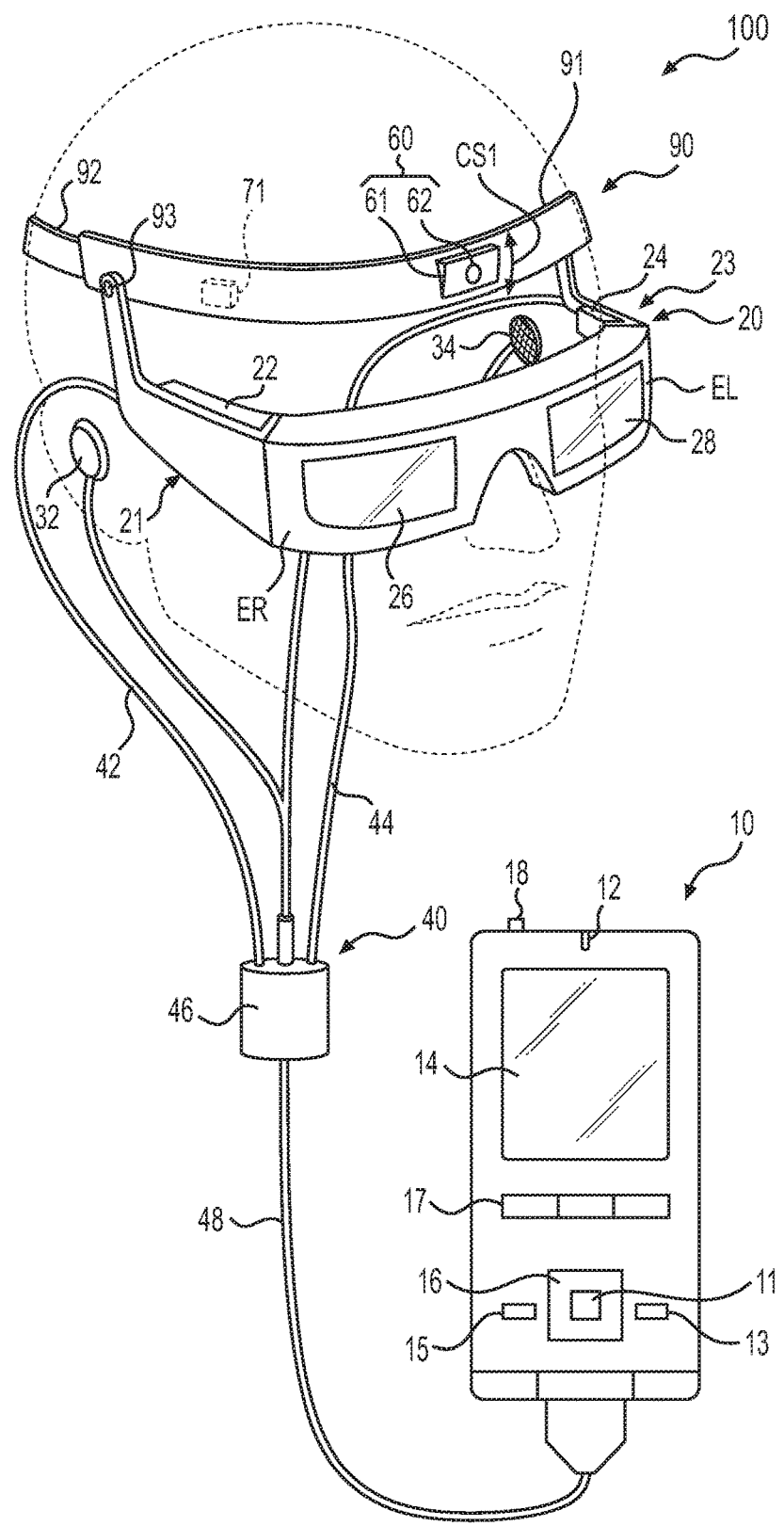
FIG. 1 is a diagram including a schematic configuration of an example head mounted display (HMD) according to an embodiment.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes a determination key 11, a lighting unit 12, a display changing key 13, a track pad 14, a luminance changing key 15, a direction key 16, a menu key 17, and a power switch 18. The determination key 11 detects a pushing operation, so as to output a signal for determining content operated in the control section 10. The lighting unit 12 indicates an operation state of the HMD 100 by using a light emitting state thereof. The operation state of the HMD 100 includes, for example, ON and OFF of power, or the like. For example, an LED is used as the lighting unit 12. The display changing key 13 detects a pushing operation so as to output a signal for changing a content moving image display mode between 3D and 2D. The track pad 14 detects an operation of the finger of the user on an operation surface of the track pad 14 so as to output a signal based on detected content. Various track pads of a capacitance type, a pressure detection type, and an optical type may be employed as the track pad 14. The luminance changing key 15 detects a pushing operation so as to output a signal for increasing or decreasing a luminance of the image display section 20. The direction key 16 detects a pushing operation on keys corresponding to vertical and horizontal directions so as to output a signal based on detected content. The power switch 18 detects a sliding operation of the switch so as to change a power supply state of the HMD 100.

Figure 2:
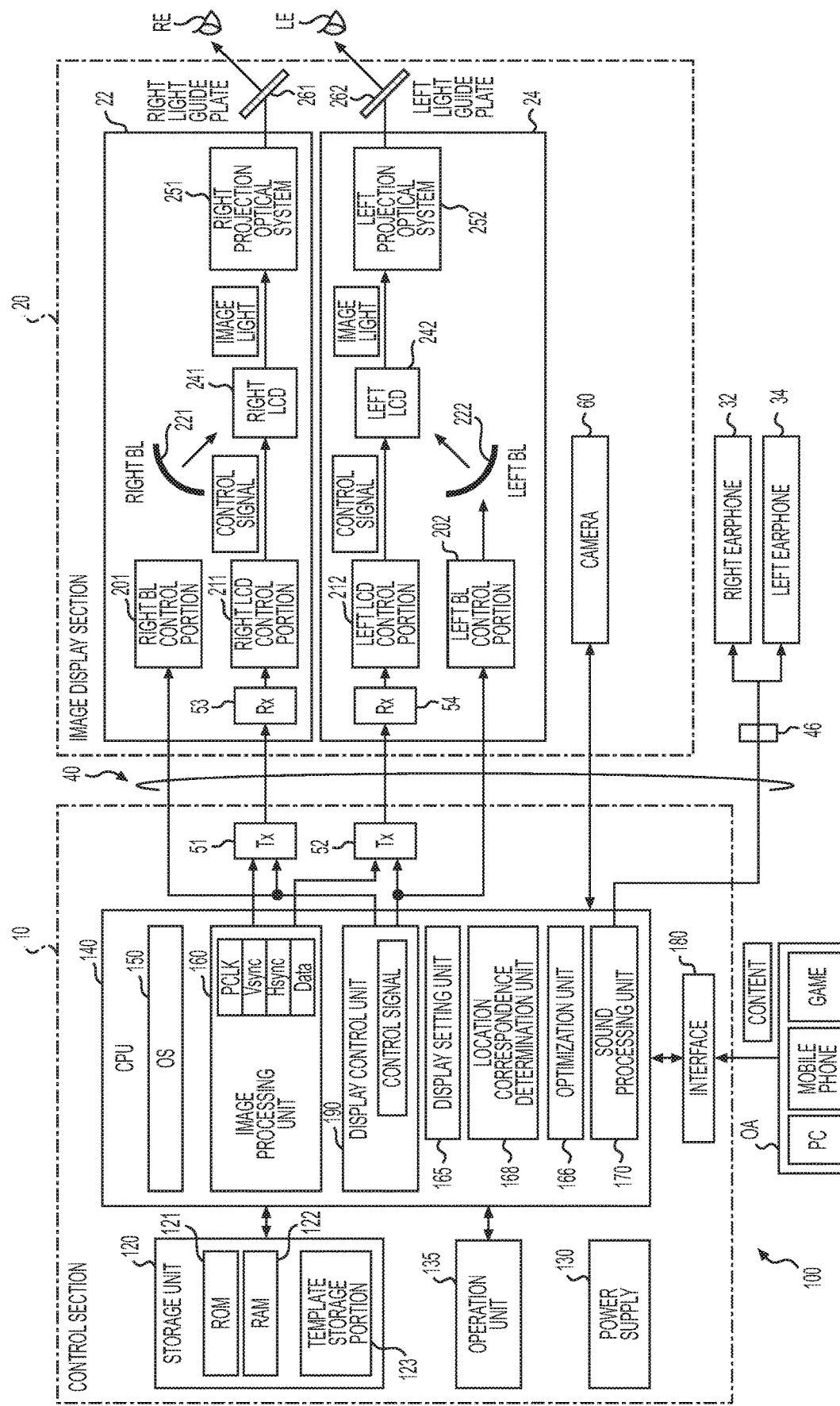
FIG. 2 is a block diagram illustrating a functional configuration of the HMD shown in FIG. 1 according to an embodiment.

FIG. 2 is a block diagram functionally showing the configuration of the HMD 100. As shown in FIG. 2, the control section 10 includes a ROM 121, a RAM 122, a power supply 130, the operation section 135, the operation section including a determination key 11, a lighting unit 12, a display changing key 13, a track pad 14, a luminance changing key 15, a direction key 16, a menu key 17, and a power switch 18, which receive operations from a user. The control section also includes a CPU 140 (sometimes also referred to herein as processor 140), an interface 180, and a transmitter 51 (Tx 51) and a transmitter 52 (Tx 52).

The power supply 130 supplies electric power to the sections of the HMD 100. For example, a secondary battery may be used as the power supply 130. Various computer programs are stored in a storage unit 120 which includes a ROM 121 storing a computer program, a RAM 122 which is used for the CPU 140 to perform reading and writing of various computer programs, and a template storage portion 123. The template storage portion 123 may store a super-template created by the template creator of a personal computer PC described in more detail later. The template storage portion 123 acquires the super-template via a USB memory connected to the interface 180. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, an image setting unit 165, a location-correspondence determination unit 168, and an optimization unit 166.

The display control section 190 generates control signals for controlling the right display driver 22 and the left display driver 24. Specifically, the display control unit 190 individually controls the right LCD control portion 211 to turn on and off driving of the right LCD 241, controls the right backlight control portion 201 to turn on and off driving of the right backlight 221, controls the left LCD control portion 212 to turn on and off driving of the left LCD 242, and controls the left backlight control portion 202 to turn on and off driving of the left backlight 222, by using the control signals. Consequently, the display control unit 190 controls each of the right display driving unit 22 and the left display driving unit 24 to generate and emit image light. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing unit 160 acquires an image signal included in content. The image processing unit 160 separates synchronization signals such as a vertical synchronization signal VSync and a horizontal synchronization signal HSync from the acquired image signal. The image processing unit 160 generates a clock signal PCLK by using a phase locked loop (PLL) circuit or the like (not illustrated) on the basis of a cycle of the separated vertical synchronization signal VSync or horizontal synchronization signal HSync. The image processing unit 160 converts an analog image signal from which the synchronization signals are separated into a digital image signal by using an A/D conversion circuit or the like (not illustrated). Next, the image processing unit 160 stores the converted digital image signal in a DRAM of the storage unit 120 for each frame as image data (RGB data) of a target image. The image processing unit 160 may perform, on the image data, image processes including a resolution conversion process, various color tone correction processes such as adjustment of luminance and color saturation, a keystone correction process, and the like, as necessary.

The image processing unit 160 transmits each of the generated clock signal PCLK, vertical synchronization signal VSync and horizontal synchronization signal HSync, and the image data stored in the DRAM of the storage unit 120, via the transmission units 51 and 52. Here, the image data which is transmitted via the transmission unit 51 is referred to as "right eye image data", and the image data which is transmitted via the transmission unit 52 is referred to as "left eye image data". The transmission units 51 and 52 function as a transceiver for serial transmission between the control section 10 and the image display section 20.

The sound processing unit 170 acquires an audio signal included in the content so as to amplify the acquired audio signal, and supplies the amplified audio signal to a speaker (not illustrated) of the right earphone 32 connected to the connection member 46 and a speaker (not illustrated) of the left earphone 34 connected thereto. In addition, for example, in a case where a Dolby (registered trademark) system is employed, the audio signal is processed, and thus different sounds of which frequencies are changed are respectively output from the right earphone 32 and the left earphone 34.

In a case where an image of external scenery including a target object is captured by the camera 60, the location-correspondence determination unit 168 detects edges of the target object in the captured image. Then, the location-correspondence determination unit 168 determines correspondences between the edges (edge feature elements) of the target object and the contour feature elements of the 2D model stored in the template storage portion 123. In the present embodiment, a plurality of templates are created and stored in advance with a specific target object (for example, a specific part) as a preset target object. Therefore, if a preset target object is included in a captured image, the location-correspondence determination unit 168 determines correspondences between 2D locations of edges of the target object and 2D locations of 2D model points of the target object included in a template selected among from a plurality of the templates in different views. A specific process of determining or establishing the correspondences between the edge feature elements of the target object in the captured image and the contour feature elements of the 2D model in the template will be described later.

The optimization unit 166 outputs 3D model points, which include respective 3D locations, corresponding to 2D model points having the correspondences to the image points from the template of the target object, and minimizes a cost function in Equation (14) on the basis of the image points, the 3D model points, and the view represented by at least one transformation matrix, so as to estimate a location and a pose in the three dimensions of the target object included in the external scenery imaged by the camera 60. Estimation and/or optimization of a position and a pose of the imaged target object will be described later.

The image setting unit 165 performs various settings on an image (display image) displayed on the image display section 20. For example, the image setting unit 165 sets a display position of the display image, a size of the display image, luminance of the display image, and the like, or sets right eye image data and left eye image data so that binocular parallax (hereinafter, also referred to as "parallax") is formed in order for a user to stereoscopically (3D) visually recognize the display image as a three-dimensional image. The image setting unit 165 detects a determination target image set in advance from a captured image by applying pattern matching or the like to the captured image.

The image setting unit 165 displays (renders) a 3D model corresponding to the target object on the optical image display units 26 and 28 in a pose of target object which is derived and/or optimized by the optimization unit 166 in a case where the location-correspondence determination unit 168 and the optimization unit 166 are performing various processes and have performed the processes. The operation unit 135 receives an operation from the user, and the user can determine whether or not the estimated pose of the target object matches a pose of the target object included in the external scenery transmitted through the optical image display units 26 and 28.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image. In other embodiments, the technology disclosed as an embodiment may be applied to any suitable device including a camera and a display, such as a mobile phone, a tablet computer, and the like.

Figure 3:
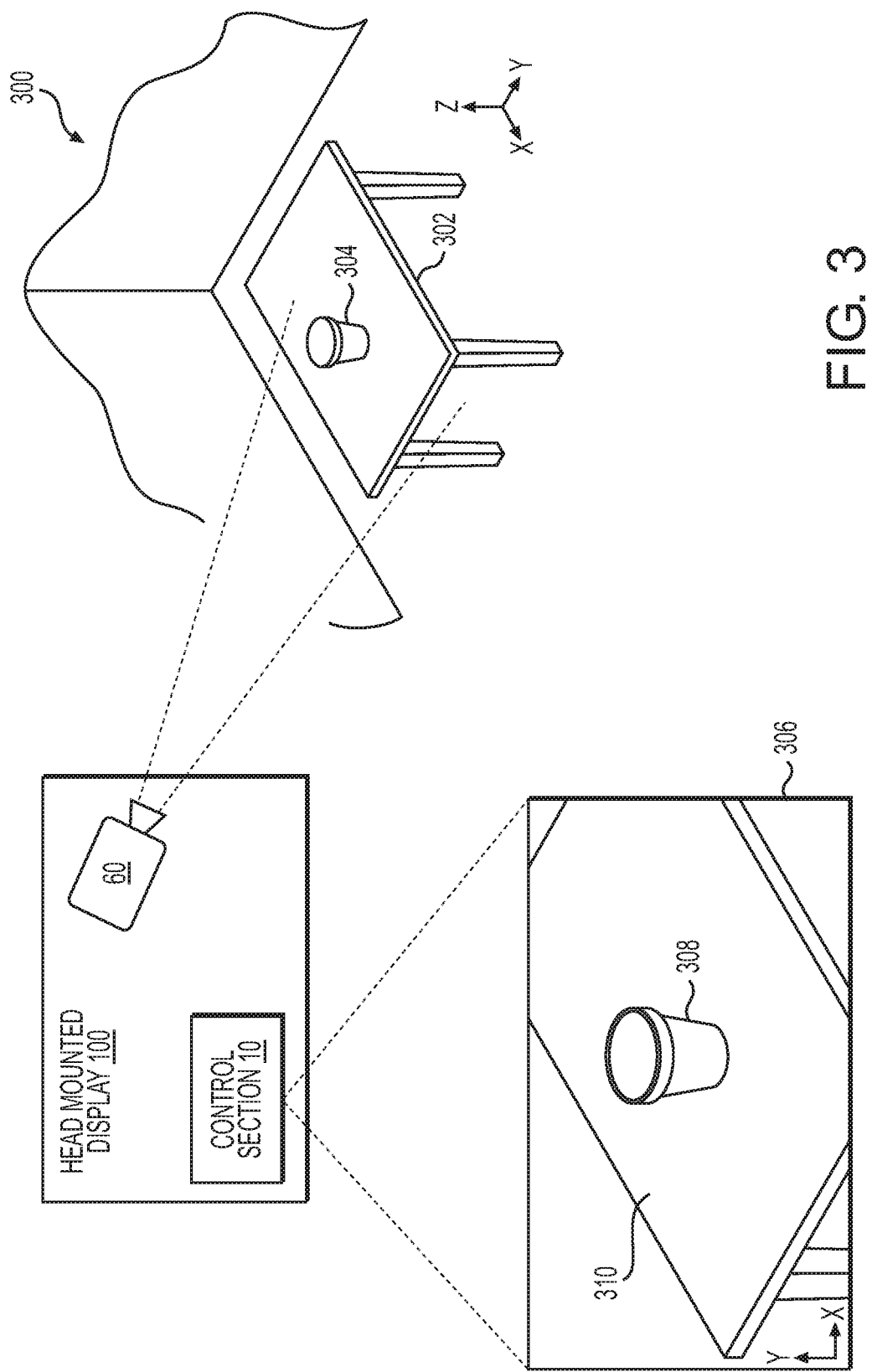
FIG. 3 is a diagram illustrating use of the HMD shown in FIGS. 1 and 2 in a 3D real-world scene according to an embodiment.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. In some embodiments a calibration is performed to align the 3D coordinate system of the camera 60 with the 3D coordinate system of the user in order to attempt to minimize any difference between the viewpoint of the camera and the viewpoint of the user. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

The control section 10 attempts to locate the representation 310 of the object 304 in the image frame 306 and determine its pose. The control section 10 then attempts to track the representation 310 of the object 304 and update the pose of the object through subsequent image frames.

Configuration of Information Processing Device

Figure 4:
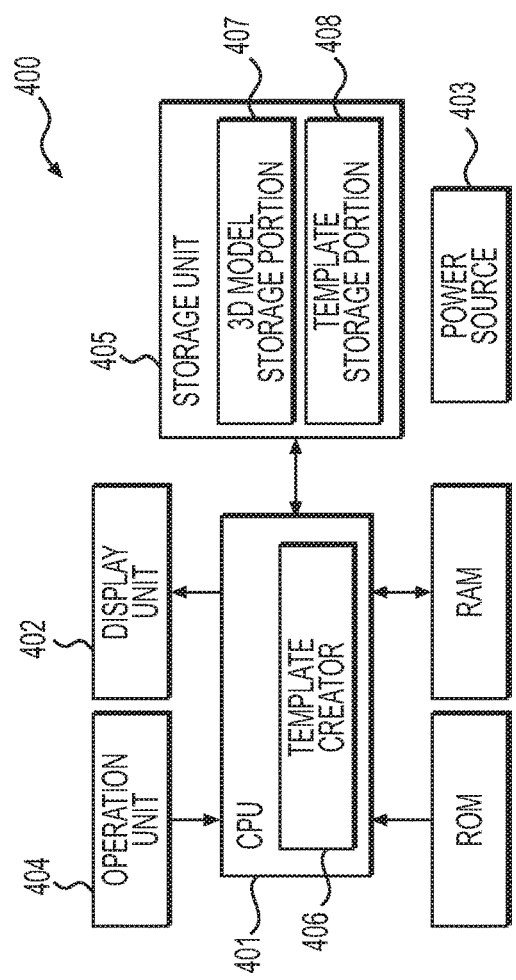
FIG. 4 is a block diagram illustrating a functional configuration of an information processing device according to an embodiment.

FIG. 4 is a block diagram illustrating a possible functional configuration of a personal computer PC as an information processing device in the present embodiment. The personal computer PC includes a CPU 401, a display unit 402, a power source 403, an operation unit 404, a storage unit 405, a ROM, and a RAM. The power source 403 supplies power to each unit of the personal computer PC. As the power source 403, for example, a secondary battery may be used. The operation unit 404 is a user interface (UI) for receiving an operation from a user. The operation unit 404 is constituted of a keyboard and a mouse.

The storage unit 405 stores various items of data, and is constituted of a hard disk drive and the like. The storage unit 405 includes a 3D model storage portion 407 and a template storage portion 408. The 3D model storage portion 407 stores a three-dimensional model of a target object, created by using computer-aided design (CAD). The template storage portion 408 stores a template created by a template creator 406. Details of the template created by the template creator 406 will be described later.

The CPU 401 reads various programs from the ROM and develops the programs in the RAM, so as to execute the various programs. The CPU 401 includes the template creator 406 which executes a program for creating a template. The template is defined as data in which, with respect to a single three-dimensional model (3D CAD in the present embodiment) stored in the 3D model storage portion 407, coordinate values of points (2D model points) included in a contour line (hereinafter, also simply referred to as a "contour") representing an exterior of a 2D model obtained by projecting the 3D model onto a virtual plane on the basis of a virtual specific viewpoint (hereinafter, also simply referred to as a "view"), 3D model points obtained by converting the 2D model points into points in an object coordinate system on the basis of the specific view, and the specific view are correlated with each other. The virtual viewpoint of the present embodiment is represented by a rigid body transformation matrix used for transformation from the object coordinate system into a virtual camera coordinate system and represented in the camera coordinate system, and a perspective projection transformation matrix for projecting three-dimensional coordinates onto coordinates on a virtual plane. The rigid body transformation matrix is expressed by a rotation matrix representing rotations around three axes which are orthogonal to each other, and a translation vector representing translations along the three axes. The perspective projection transformation matrix is appropriately adjusted so that the virtual plane corresponds to a display surface of a display device or an imaging surface of the camera. A CAD model may be used as the 3D model as described later. Hereinafter, performing rigid body transformation and perspective projection transformation on the basis of a view will be simply referred to as "projecting".

Template Creation

Figure 5:
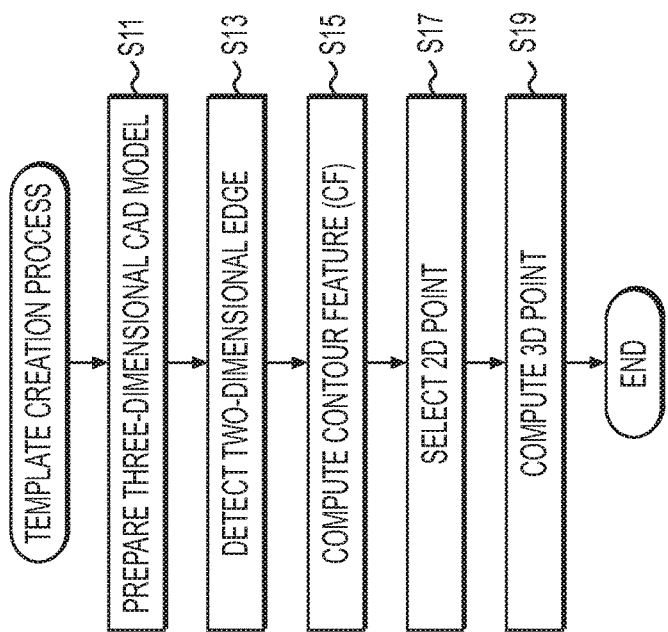
FIG. 5 is a flow diagram illustrating a template creation process according to an embodiment.

FIG. 5 is a flowchart illustrating a template creation process performed by the template creator 406. The template creator 406 creates T templates obtained when a three-dimensional model for a target object stored in the 3D model storage portion 407 is viewed from T views. In the present embodiment, creation of a template will also be referred to as "training".

In the template creation process, first, the template creator 406 prepares a three-dimensional model stored in the 3D model storage portion 407 (step S11). Next, the template creator 406 renders CAD models by using all possible in-plane rotations (1, . . . , and P) for each of different t views, so as to obtain respective 2D models thereof. Each of the views is an example of a specific viewpoint in this application. The template creator 406 performs edge detection on the respective 2D models so as to acquire edge features (step S13).

The template creator 406 computes contour features (CF) indicating a contour of the 2D model on the basis of the edge features for each of T (P×t) views (step S15). If a set of views which are sufficiently densely sampled is provided, a view having contour features that match image points which will be described later can be obtained. The 2D model points are points representing a contour of the 2D model on the virtual plane or points included in the contour. The template creator 6 selects representative 2D model points from among the 2D model points in the 2D contour with respect to each sample view as will be described in the next section, and computes descriptors of the selected features. The contour feature or the edge feature may also be referred to as a feature descriptor, and is an example of feature information in the instant application.

If computation of the contour features in the two dimensions is completed, the template creator 406 selects 2D contour features (step S17). Next, the template creator 406 computes 3D points having 3D coordinates in the object coordinate system corresponding to respective descriptors of the features (step S19).

Selection of 2D Model Points

The template creator 406 selects N points which are located at locations where the points have high luminance gradient values (hereinafter, also referred to as "the magnitude of gradient") in a scalar field and which are sufficiently separated from each other from among points disposed in the contour with respect to each sample view. Specifically, the template creator 406 selects a plurality of points which maximize a score expressed by the following Equation (1) from among all points having sufficient large magnitudes of gradient.

$$\sum_{i=1}^{N}\left[E_i \min_{j \neq i}\{D_{ij}^2\}\right] \quad (1)$$

In Equation (1), $E_i$ indicates a magnitude of gradient of a point i, and $D_{ij}$ indicates a distance between the point i and a point j. In the present embodiment, in order to maximize a score shown in Equation (1), first, the template creator 6 selects a point having the maximum magnitude of gradient as a first point. Next, the template creator 6 selects a second point which maximizes $E_2 D_{21}^2$. Next, the template creator 6 selects a third point which maximizes the following Equation (2). Then, the template creator 6 selects a fourth point, a fifth point, . . . , and an N-th point.

$$E_3 \min_{j=[1,2]}(D_{3j}^2) \quad (2)$$

Figure 6:
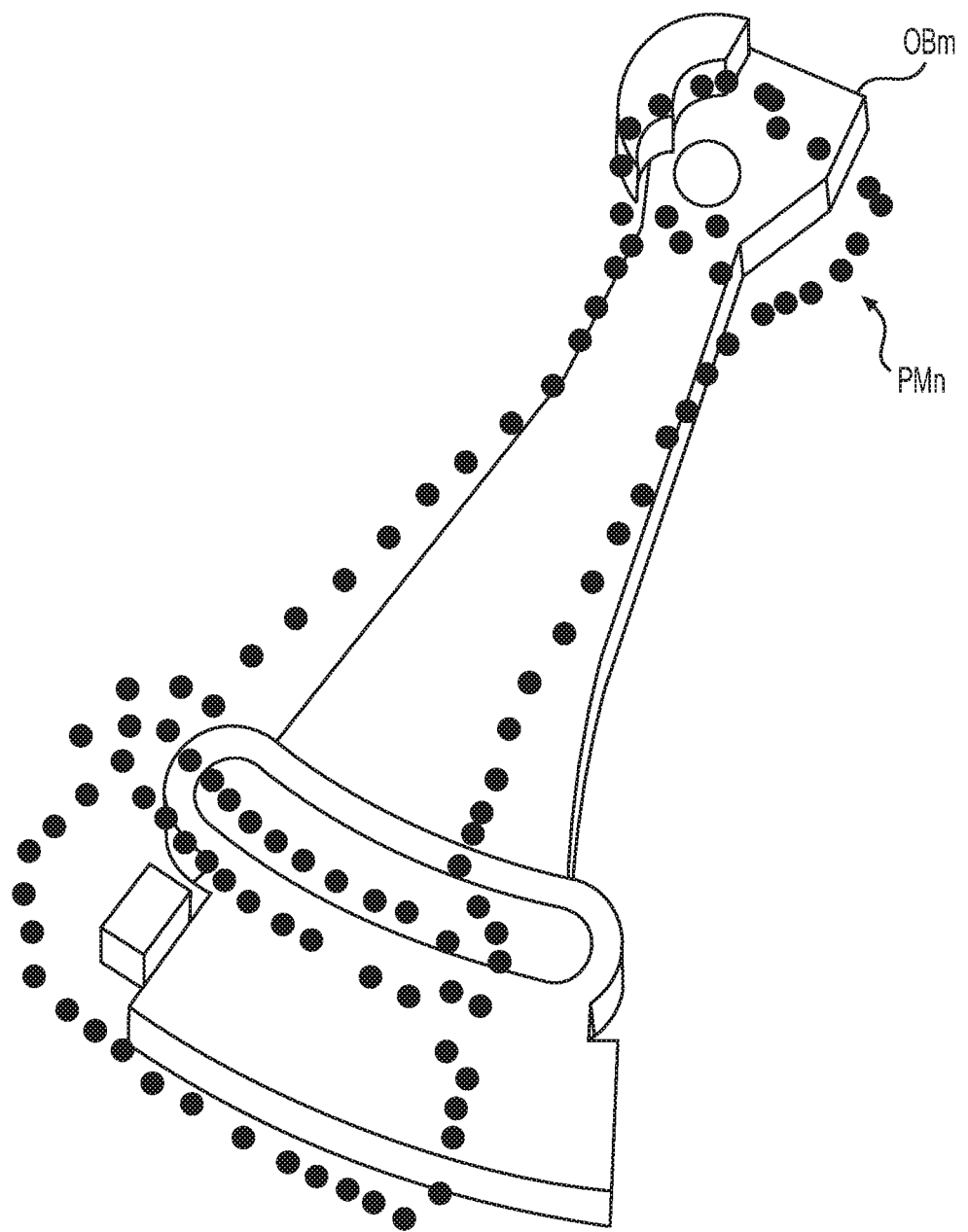
FIG. 6 is a representation of model points on a target object according to an embodiment.

FIG. 6 is a diagram illustrating a set PMn of N 2D model points calculated by using Equation (1). In FIG. 6, the set PMn of 2D model points is displayed to overlap a captured image of a target object OBm. In order to differentiate the captured image of the target object OBm from the 2D model set PMn, a position of the target object OBm is deviated relative to the set PMn. As illustrated in FIG. 6, the set PMn of 2D model points which is a set of dots calculated by using Equation (1) is distributed so as to substantially match a contour of the captured image of the target object OBm. If the set PMn of 2D model points is calculated, the template creator 406 correlates a position, or location, of the 2D model point with gradient (vector) of luminance at the position, and stores the correlation result as a contour feature at the position.

Determination of 3D Model Point and Creation of Template

The template creator 406 calculates 3D model points corresponding to the calculated set PMn of 2D model points. The combination of the 3D model points and contour features depends on views.

If a 2D model point and a view V are provided, the template creator 6 computes a 3D model point $P_{OBJ}$ by the following three steps.

1. A depth map of a 3D CAD model in the view V is drawn (rendered) on the virtual plane.
2. If a depth value of a 2D model point p is obtained, 3D model coordinates $P_{CAM}$ represented in the camera coordinate system are computed.
3. Inverse 3D transformation is performed on the view V, and coordinates $P_{OBJ}$ of a 3D model point in the object coordinate system (a coordinate system whose origin is fixed to the 3D model) are computed.

As a result of executing the above three steps, the template creator 6 creates, into a single template, a view matrix $V_t$ for each view t expressed by the following Expression (3), 3D model points in the object coordinate system associated with respective views expressed by the following Expression (4), and descriptors of 2D features (hereinafter, also referred to as contour features) corresponding to the 3D model points in the object coordinate system and associated with the respective views, expressed by the following Expression (5).

Figure 7:
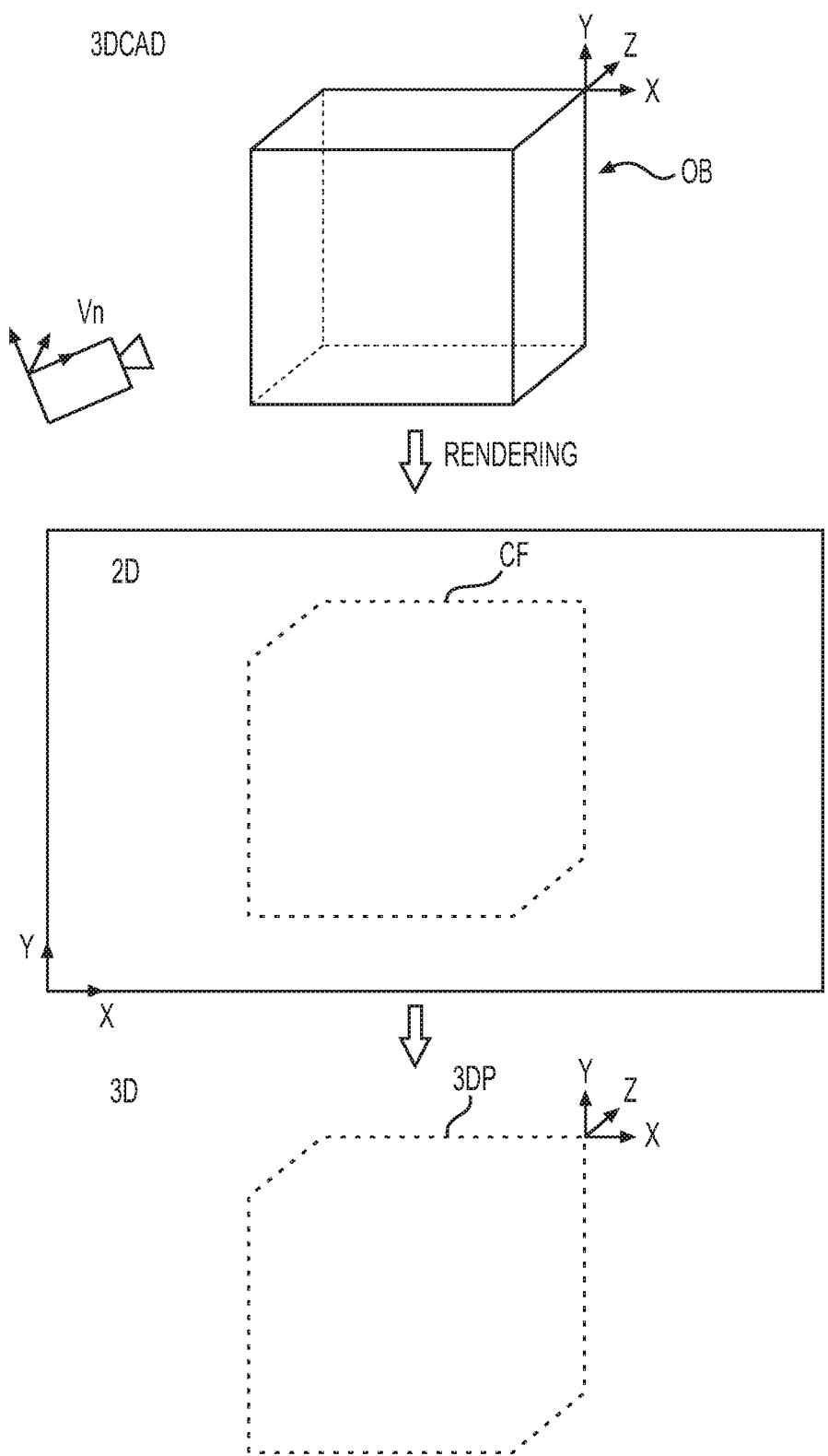
FIG. 7 is a schematic diagram according to an embodiment.

FIG. 7 is a schematic diagram illustrating a relationship among 3D CAD, a 2D model obtained by projecting the 3D CAD, and a 3D model created on the basis of the 2D model. As illustrated in FIG. 7 as an image diagram illustrating the template creation process described above, the template creator 406 renders the 2D model on the virtual plane on the basis of a view $V_n$ of the 3D CAD as a 3D model. The template creator 406 detects edges of an image obtained through the rendering, further extracts a contour, and selects a plurality of 2D model points included in the contour on the basis of the method described with reference to Equations (1) and (2). Hereinafter, a position of a selected 2D model point and gradient (a gradient vector of luminance) at the position of the 2D model point are represented by a contour feature CF. The template creator 406 performs inverse transformation on a 2D model point $p_i$ represented by a contour feature $CF_i$ in the two dimensional space so as to obtain a 3D model point $P_i$ in the three dimensional space corresponding to the contour feature $CF_i$. Here, the 3D model point $P_i$ is represented in the object coordinate system. The template in the view $V_n$ includes elements expressed by the following Expression (6).

$$(CF_{1n}, CF_{2n}, \ldots, 3DP_{1n}, 3DP_{2n}, \ldots, V_n) \tag{6}$$

In Expression (6), a contour feature and a 3D model point (for example, $CF_{1n}$ and $3DP_{1n}$) with the same suffix are correlated with each other. A 3D model point which is not detected in the view $V_n$ may be detected in a view $V_m$ or the like which is different from the view $V_n$.

In the present embodiment, if a 2D model point p is provided, the template creator 406 treats the coordinates of the 2D model point p as integers representing a corner of a pixel. Therefore, a depth value of the 2D model point p corresponds to coordinates of (p+0.5). As a result, the template creator 6 uses the coordinates of (p+0.5) for inversely projecting the 2D point p. When a recovered 3D model point is projected, the template creator 406 truncates floating-point coordinates so as to obtain integer coordinates.

In-Plane Rotation Optimization for Training

If a single view is provided, substantially the same features can be visually recognized from the single view, and thus the template creator 406 creates a plurality of templates by performing in-plane rotation on the single view. The template creator 406 can create a plurality of templates with less processing by creating the templates having undergone the in-plane rotation. Specifically, the template creator 406 defines 3D points and CF descriptors for in-plane rotation of 0 degrees in the view t according to the following Expressions (7) and (8), respectively, on the basis of Expressions (4) and (5).

$$\{P_1, \ldots, P_N\}_{t,0} \tag{7}$$

$$\{CF_1, \ldots, CF_N\}_{t,0} \tag{8}$$

The template creator 406 computes 3D model points and contour feature descriptors with respect to a template at in-plane rotation of α degrees by using Expressions (7) and (8). The visibility does not change regardless of in-plane rotation, and the 3D model points in Expression (7) are represented in the object coordinate system. From this fact, the 3D model points at in-plane rotation of α degrees are obtained by only copying point coordinates of the 3D model points at in-plane rotation of 0 degrees, and are thus expressed as in the following Equation (9).

$$\{P_1, \ldots, P_N\}_{t,\alpha} = \{P_1, \ldots, P_N\}_{t,0} \tag{9}$$

The contour features at in-plane rotation of α degrees are stored in the 2D coordinate system, and thus rotating the contour features at in-plane rotation of 0 degrees by α degrees is sufficient. This rotation is performed by applying a rotation matrix of 2×2 to each vector $CF_i$, and is expressed as in the following Equation (10).

$$CF_i^{t,\alpha} = \begin{bmatrix} \cos\alpha & \sin\alpha \\ -\sin\alpha & \cos\alpha \end{bmatrix} CF_i^{t,0} \tag{10}$$

The rotation in Equation (10) is clockwise rotation, and corresponds to the present view sampling method for training. The view t corresponds to a specific viewpoint in the instant application. The set PMn of 2D model points corresponds to positions of a plurality of feature points in the two dimensions, and the 3D model points correspond to the positions of a plurality of feature points in the three dimensions, represented in the object coordinate system.

Super-Template

The template creator 406 selects K (for example, four) templates in different views t, and merges the selected K templates into a single super-template. The template creator 406 selects templates whose views t are closest to each other as the K templates. Thus, there is a high probability that the super-template may include all edges of a target object which can be visually recognized on an object. Consequently, in a case where a detected pose of the target object is optimized, there is a high probability of convergence on an accurate pose.

As described above, in the personal computer PC of the present embodiment, the template creator 406 detects a plurality of edges in the two dimensions in a case where a three-dimensional CAD model representing a target object is viewed from a specific view. The template creator 406 computes 3D model points obtained by transforming contour features of the plurality of edges. The template creator 406 creates a template in which the plurality of edges in the two dimensions, the 3D model points obtained through transformation, and the specific view are correlated with each other. Thus, in the present embodiment, due to the templates created by, for example, the personal computer PC, the pose of the imaged target object is estimated with high accuracy and/or within a short period of time, when the target object is imaged by a camera or the like and a template representing a pose closest to the pose of the target object in the captured image is selected.

Execution (Run-Time) of Estimation of Target Object Pose

Figure 8:
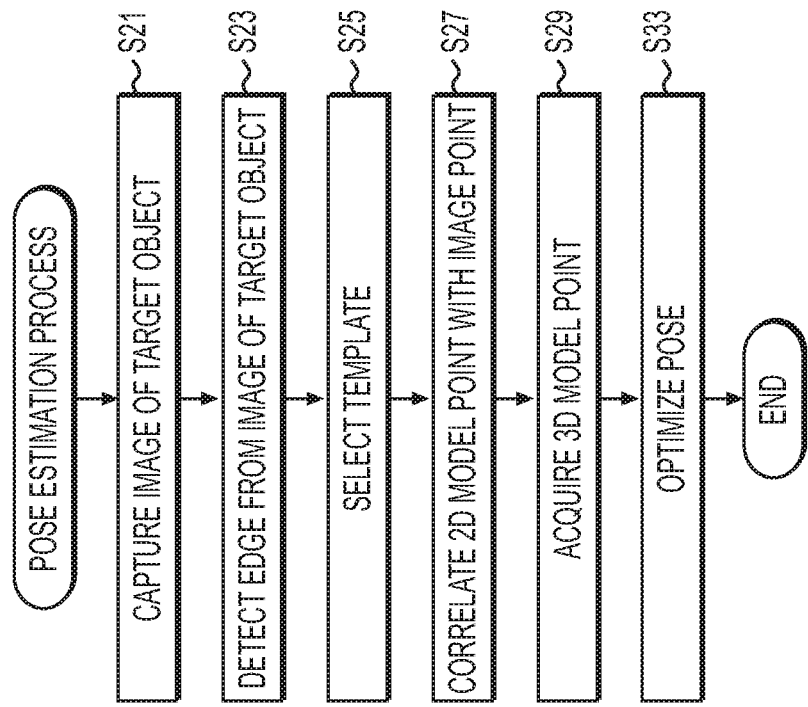
FIG. 8 is a flow diagram illustrating a target object pose estimation process according to an embodiment.

FIG. 8 is a flowchart illustrating a target object pose estimation process. In the pose estimation process, first, the location-correspondence determination unit 168 images external scenery including a target object with the camera 60 (step S21). The location-correspondence determination unit 168 performs edge detection described below on a captured image of the target object (step S23).

Edge Detection

The location-correspondence determination unit 168 detects an edge of the image of the target object in order to correlate the imaged target object with a template corresponding to the target object. The location-correspondence determination unit 168 computes features serving as the edge on the basis of pixels of the captured image. In the present embodiment, the location-correspondence determination unit 168 computes gradient of luminance of the pixels of the captured image of the target object so as to determine the features. When the edge is detected from the captured image, objects other than the target object in the external scenery, different shadows, different illumination, and different materials of objects included in the external scenery may influence the detected edge. Thus, it may be relatively difficult to detect the edge from the captured image may than to detect an edge from a 3D CAD model. In the present embodiment, in order to more easily detect an edge, the location-correspondence determination unit 168 only compares an edge with a threshold value and suppresses non-maxima, in the same manner as in procedures performed in a simple edge detection method.

Selection of Template

If the edge is detected from the image of the target object, the location-correspondence determination unit 168 selects a template having a view closest to the pose of the target object in a captured image thereof from among templates stored in the template storage portion 123 (step S25). For this selection, an existing three-dimensional pose estimation algorithm for estimating a rough pose of a target object may be used separately. The location-correspondence determination unit 168 may find a new training view closer to the pose of the target object in the image than the selected training view when highly accurately deriving a 3D pose. In a case of finding a new training view, the location-correspondence determination unit 168 highly accurately derives a 3D pose in the new training view. In the present embodiment, if views are different from each other, contour features as a set of visually recognizable edges including the 2D outline of the 3D model are also different from each other, and thus a new training view may be found. The location-correspondence determination unit 168 uses a super-template for a problem that sets of visually recognizable edges are different from each other, and thus extracts as many visually recognizable edges as possible. In another embodiment, instead of using a template created in advance, the location-correspondence determination unit 168 may image a target object, and may create a template by using 3D CAD data while reflecting an imaging environment such as illumination in rendering on the fly and as necessary, so as to extract as many visually recognizable edges as possible.

2D Point Correspondences

If the process in step S25 is completed, the location-correspondence determination unit 168 correlates the edge of the image of the target object with 2D model points included in the template (step S27).

In the present embodiment, the location-correspondence determination unit 168 computes similarity scores by using the following Equation (11) with respect to all image points included in a local vicinity of each projected 2D model point.

$$SIM(p, p') = |\vec{E}_p \cdot \vec{\nabla} I_{p'}| \Big/ \max_{q \in N(p)} \|\vec{\nabla} I_p\| \quad (11)$$

The measure of similarity scores indicated in Equation (11) is based on matching between a gradient vector (hereinafter, simply referred to as gradient) of luminance of a 2D model point included in a template and a gradient vector of an image point, but is based on an inner product of the two vectors in Equation (11) as an example. The vector of Ep in Equation (11) is a unit length gradient vector of a 2D model point (edge point) p. The location-correspondence determination unit 168 uses gradient $\nabla I$ of a test image (input image) in order to compute features of an image point p' when obtaining the similarity scores. The normalization by the local maximum of the gradient magnitude in the denominator in Expression (11) ensures that the priority is reliably given to an edge with a locally high intensity. This normalization prevents an edge which is weak and thus becomes noise from being collated. The location-correspondence determination unit 168 enhances a size N(p) of a nearest neighborhood region in which a correspondence is searched for when the similarity scores are obtained. For example, in a case where an average of position displacement of a projected 2D model point is reduced in consecutive iterative computations, N(p) may be reduced.

If the location-correspondence determination unit 168 completes the process in step S27 in FIG. 8, the optimization unit 166 acquires 3D model points corresponding to the 2D model points correlated with the image points and information regarding the view which is used for creating the 2D model points, from the template of the target object stored in the template storage portion 123 (step S29). The optimization unit 166 derives a pose of the target object imaged by the camera 60 on the basis of the extracted 3D model points and information regarding the view, and the image points (step S33). Details of the derivation are as follows.

Optimization of Pose

In the present embodiment, the optimization unit 166 highly accurately derives or refines a 3D pose of the target object by using contour features included in a template corresponding to a selected training view, and 3D model points corresponding to 2D model points included in the contour features. In the derivation, the optimization unit 166 derives a pose of the target object by performing optimization computation for minimizing Equation (14).

If the location-correspondence determination unit 168 completes establishing the correspondences between 2D model points and the image points in a predetermined view, the location-correspondence determination unit 168 reads 3D model points $P_i$ corresponding to the 2D model points (or the contour features $CF_i$) from a template corresponding to the view. In the present embodiment, as described above, the 3D model points $P_i$ corresponding to the 2D model points are stored in the template. However, the 3D model points $P_i$ are not necessarily stored in the template, and the location-correspondence determination unit 168 may inversely convert the 2D model points whose correspondences to the image points is completed, every time on the basis of the view, so as to obtain the 3D model points $P_i$.

The optimization unit 166 reprojects locations of the obtained 3D model points $P_i$ onto a 2D virtual plane on the basis of Equation (12).

$$\pi(P_i) = (u_i, v_i)^T \quad (12)$$

Here, π in Equation (12) includes a rigid body transformation matrix and a perspective projecting transformation matrix included in the view. In the present embodiment, three parameters indicating three rotations about three axes included in the rigid body transformation matrix and three parameters indicating three translations along the three axes are treated as variables for minimizing Equation (14). The rotation may be represented by a quaternion. The image points $p_i$ corresponding to the 3D model points $P_i$ are expressed as in Equation (13).

$$p_i = (p_{ix}, p_{iy})^T \quad (13)$$

The optimization unit 166 derives a 3D pose by using the cost function expressed by the following Equation (14) in order to minimize errors between the 3D model points $P_i$ and the image points $p_i$.

$$E_{match} = \sum_{i=1}^{N} w_i * \|\pi(P_i) - p_i\| \quad (14)$$

$$= \sum_{i=1}^{N} w_i * ((u_i - p_{ix})^2 + (v_i - p_{iy})^2)$$

Here, $w_i$ in Equation (14) is a weighting factor for controlling the contribution of each model point to the cost function. A point which is projected onto the outside of an image boundary or a point having low reliability of the correspondence is given a weighting factor of a small value. In the present embodiment, in order to present specific adjustment of a 3D pose, the optimization unit 166 determines minimization of the cost function expressed by Equation (14) as a function of 3D pose parameters using the Gauss-Newton method, if one of the following three items is reached:

1. An initial 3D pose diverges much more than a preset pose. In this case, it is determined that minimization of the cost function fails.
2. The number of times of approximation using the Gauss-Newton method exceeds a defined number of times set in advance.
3. A relative pose change in the Gauss-Newton method is equal to or less than a preset threshold value. In this case, it is determined that the cost function is minimized.

When a 3D pose is derived, the optimization unit 166 may attenuate refinement of a pose of the target object. Time required to process estimation of a pose of the target object directly depends on the number of iterative computations which are performed so as to achieve high accuracy (refinement) of the pose. From a viewpoint of enhancing the system speed, it may be beneficial to employ an approach that derives a pose through as small a number of iterative computations as possible without compromising the accuracy of the pose. According to the present embodiment, each iterative computation is performed independently from its previous iterative computation, and thus no constraint is imposed, the constraint ensuring that the correspondences of 2D model points are kept consistent, or that the same 2D model points are correlated with the same image structure or image points between two consecutive iterative computations. As a result, particularly, in a case where there is a noise edge structure caused by a messy state in which other objects which are different from a target object are mixed in an image captured by the camera 60 or a state in which shadows are present, correspondences of points are unstable. As a result, more iterative computations may be required for convergence. According to the method of the present embodiment, this problem can be handled by multiplying the similarity scores in Equation (11) by an attenuation weighting factor shown in the following Equation (15).

$$w(\vec{\Delta p}) = e^{-\left(\|\Delta p\|^2\right)/\sigma^2} \quad (15)$$

Equation (15) expresses a Gaussian function, and $\sigma$ has a function of controlling the strength (effect) of attenuation. In a case where a value of $\sigma$ is great, attenuation does not greatly occur, but in a case where a value of $\sigma$ is small, strong attenuation occurs, and thus it is possible to prevent a point from becoming distant from the present location. In order to ensure consistency in correspondences of points in different iterative computations, in the present embodiment, $\sigma$ is a function of a reprojecting error obtained through the latest several iterative computations. In a case where a reprojecting error (which may be expressed by Equation (14)) is considerable, in the method of the present embodiment, convergence does not occur. In an algorithm according to the present embodiment, $\sigma$ is set to a great value, and thus a correspondence with a distant point is ensured so that attenuation is not almost or greatly performed. In a case where a reprojecting error is slight, there is a high probability that a computation state using the algorithm according to the present embodiment may lead to an accurate solution. Therefore, the optimization unit 166 sets $\sigma$ to a small value so as to increase attenuation, thereby stabilizing the correspondences of points.

Simplified Constellations 3D Pose Estimation

Embodiments directed to 3D pose estimation follow. In some embodiments, the 3D pose estimation occurs during an online training environment.

Training data or features of the object corresponding to new views obtained while tracking the pose of the object according to the following disclosure may be used to train an object pose estimation algorithm model using accompanying hardware and employing the deep learning neural network or the random forest methods. The accompanying hardware (e.g., the information processing device with CPU 1 and HMD 100 and all corresponding components) in such methods may be the same as those described in the embodiments above. Further, In addition to or instead of such algorithm models, an object pose estimation algorithm model and the hardware that is described in the sections above may also be used in connection with the methods described below.

Figure 9:
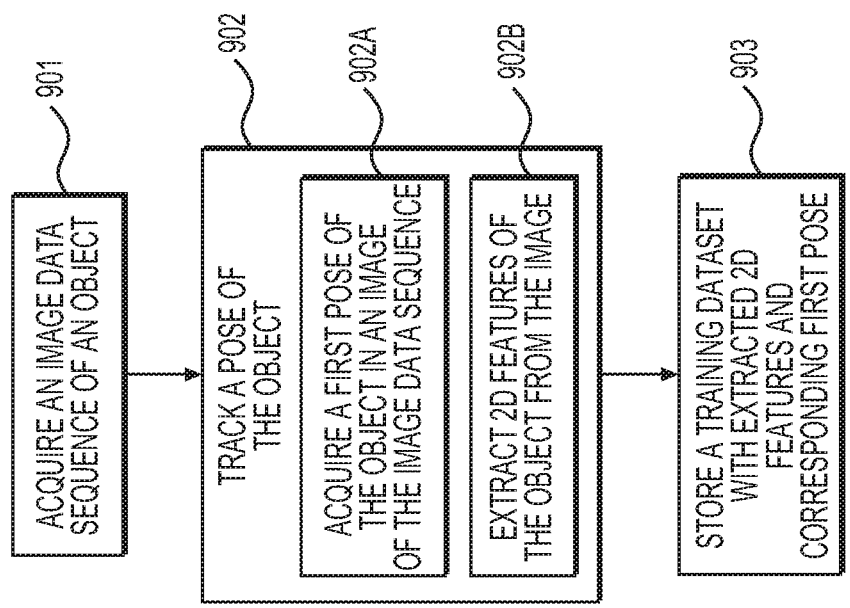
FIG. 9 is a flow diagram of a method of training according to an embodiment.

FIG. 9 shows the following steps: step 901 acquire an image data sequence; step 902 track a pose of the object; step 902A acquire a first pose; step 902B extract 2D features; and step 903 store a training dataset. With reference to FIG. 9, the relationship of performing extraction during pose tracking is shown. In some embodiments, an image data sequence is acquired in step 501 in FIG. 9. The techniques of FIG. 9 may be implemented using the hardware described within FIGS. 1-3.

At some time after the acquisition of the image data sequence, either before, in conjunction with or after 2D feature extraction as described in further detail below and shown in step 902B, a first pose of the object may be acquired. This step is shown as step 902A in FIG. 9, whereby the first pose of the object is acquired in an image of the image data sequence. In some embodiments, the acquisition of the first pose of the object and the extraction of the 2D features of the object from the image occurs during the tracking of the pose, e.g., in an online learning environment (shown as step 902).

It is noted that the step of tracking a pose of the object (step 902) illustrated in FIG. 9 to be covering steps 902A and 902B which is intended to mean that steps 902A and 902B are done while step 902 is being performed.

Upon acquisition of the image data sequence, and either before or after acquisition of the pose of the object with respect to the camera, a feature extraction step may occur. As shown in FIG. 9, a step of extracting 2D features of the object from the first image may occur. This may occur, as shown in FIG. 9, during the tracking of the pose (e.g., in an online learning environment) as in step 902B. However, the extraction of the 2D features may also be performed before or after or concurrent with the acquiring the pose of the object in the image.

The extraction in step 902B of FIG. 9 may be performed by a suitable method. The computer may then incorporate the extracted feature data into the original training data to create updated training data. For example, maxima and minima features through an image gradient can be used to acquire the keypoints. In some embodiments, the updated training data replaces the original training data in a training data storage portion, which may correspond to, for example, the template storage portion 123 in FIG. 2. In other embodiments, both sets of training data are kept. In some embodiments, the computer outputs the updated training data to the HMD 100, either in addition to storing it in the training data storage portion or instead of storing it in the training data storage portion. The HMD 100 may then use the updated training data to replace the original training data.

Once the features are extracted, a training dataset including such features is placed, or stored, into a memory along with a corresponding first pose, as shown in step 503 of FIG. 9. This may be used for faster keypoint matching.

Figure 10A:
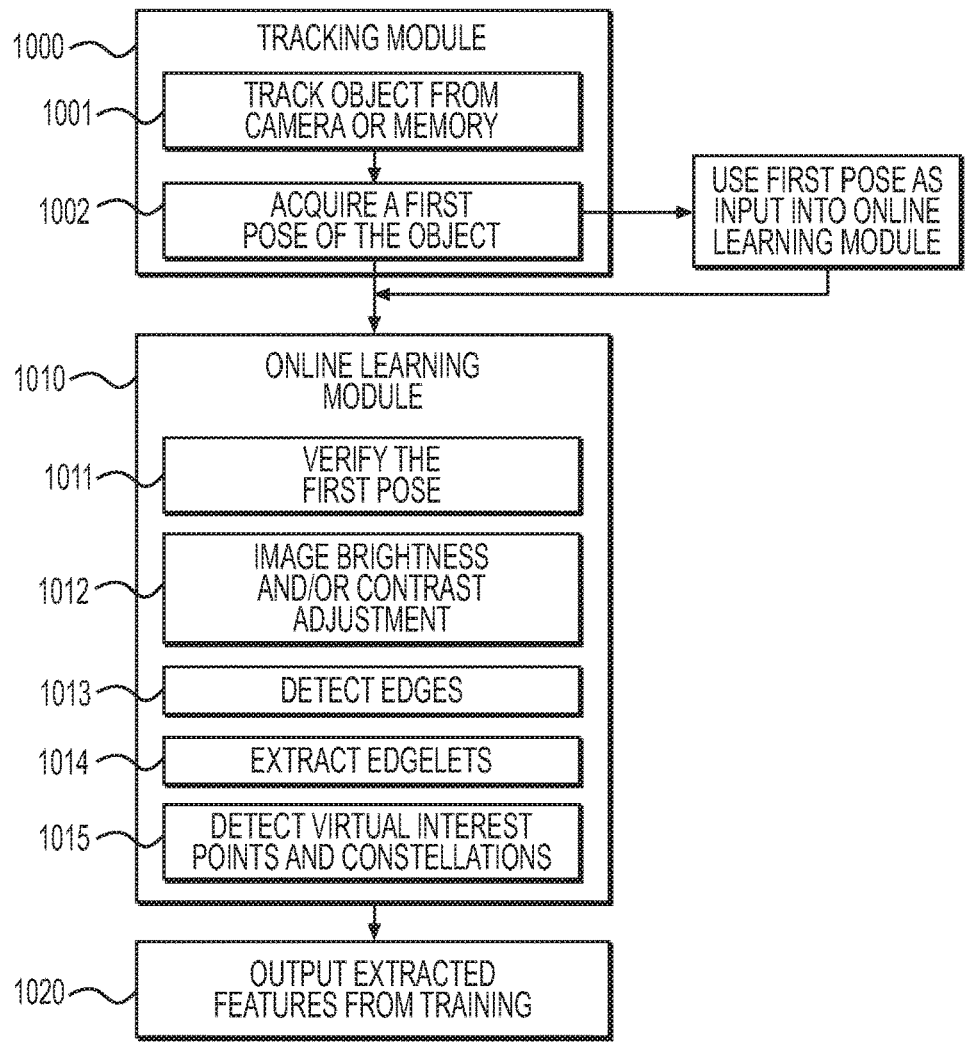
FIG. 10A is a flow diagram of a method of training according to an embodiment.
Figure 10B:
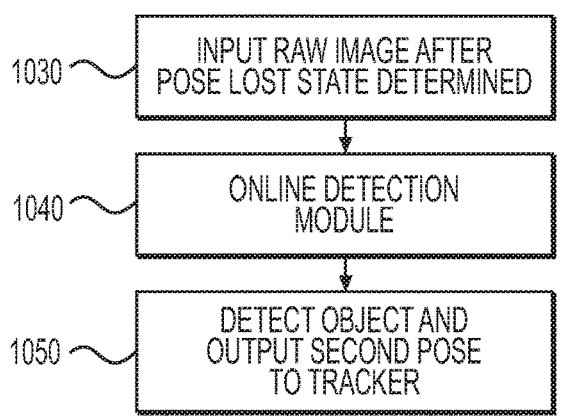
FIG. 10B is a flow diagram of a method of detecting according to an embodiment.

FIGS. 10A and 10B provides a block diagram of a solution for learning untrained views and detecting such views while tracking the object. Such a solution may advantageously be done in an online learning environment and may allow for a robust technique to train untrained views while also tracking on runtime (e.g., in an online tracking environment). The solution may also advantageously detect the object when it is lost out of the trained view-range. As with FIG. 9, the techniques of FIGS. 10A and 10B may be implemented using the hardware described within FIGS. 1-3.

It is noted that the term "online" means, in one embodiment herein, that the system is running and actively tracking (and/or determining a pose of) an object and "offline" refers to the time period before or after the system is tracking an object or determining a pose of an object (instead of while these actions are happening). For example, an online learning environment relates to learning during the system tracking an object so that during tracking of the object, data is collected, analyzed, stored and then using the stored data to continue said tracking of the object.

In an online training module, an object is tracked using an object pose tracking module 1000. The object is tracked, for example, in a step 1001 by a camera such as camera 60 described herein. That is, the object is tracked from a camera or memory storing an image data sequence captured by the camera, and an image data sequence containing images of an object in a scene along time is acquired. Using the acquired image data sequence, step 1002 acquires a first pose of the object in a first image of the image data sequence from the first pose being a result of tracking a pose of the object through an object pose tracking algorithm. The object pose tracking module (or algorithm) 1000 is further defined herein according to some embodiments.

Such an object pose tracking algorithm may require a user to move around a real-world object until her view of the object is similar to the view at which one of the poses was captured to create the original training data. Original training data based on one or a few poses of the object may be based on synthetic image(s) of a 3D model (such as a CAD model) rendered from a predetermined view(s) and/or a camera image(s) of a reference real object captured from the predetermined view(s). The 3D model and the reference real object correspond to the real object. Additionally, or alternatively, the original training data may be based on only the shape of the object, without any data about surface features, such as color, texture, surface images/text, etc. The CPU 140 of the HMD 100 may track a pose of the real object with respect to the camera. The input into the training module is a tracker pose of the object generated by the camera, and the input can be into, for example, the template storage portion 123.

Next, in the training portion of the method, an online learning module 1010 performs training. The training may be for training of views and may be performed online. The input into the training phase is a pose extracted from the object pose tracking algorithm 1000 discussed above. Using the pose (e.g., the first pose as described above), various views of the first pose are further trained during the training step 1010 as described below with regard to steps 1011-1015.

Figure 11:
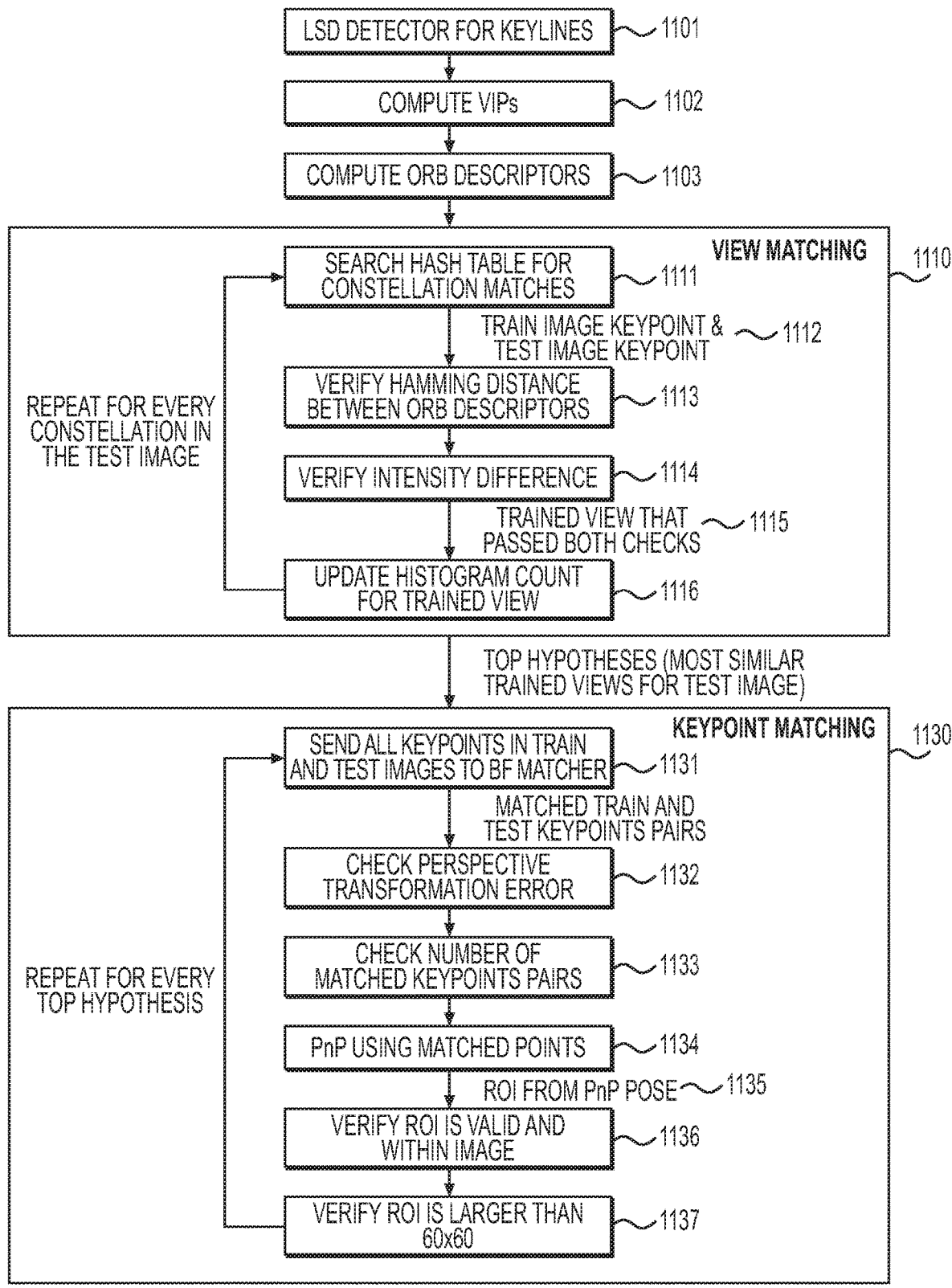
FIG. 11 is a flow diagram of a method of detecting according to an embodiment.

In some embodiments, the view is trained via an edgelet method as shown in step 1013 and described in further detail with respect to FIG. 11. In some embodiments, the view training begins with a verification of the tracker pose. That is, a step 1011 to verify the first pose may be performed. The verification may be performed by the CPU 140 or other hardware to verify if the tracker pose is correct or incorrect pose. This may involve a computerized comparison with stored poses that were previously generated for the object, or some other stored data in a memory, and/or can be determined by a user reviewing the pose and verifying that it is the correct pose. Also, the verification may take a region of interest of the object, determine its size, and compare data from the tracker pose to data of a similar region of interest of the stored poses or other data. For example, the verification may be geometric or shape-based, with shapes of the object within the region of interest being compared between the tracker pose and the stored poses, and/or appearance based.

The training of the view may also optionally include an image brightness and a contrast adjustment step 1012. The step includes detecting an image brightness and/or contrast. If the image brightness and/or image contrast is below a predetermined level, the step 1012 may further include adjusting the image brightness and/or contrast to the predetermined level. The predetermined level may be preset by a computer or by a user, and may be a level appropriate to ensure optimal extraction of edges by the edgelet extractor in the subsequent step.

The training of the view also includes edgelet extraction. First, in a step 1013, an edge detection step is performed. Such a detection may be an edge detection module such as Canny edge detection, Sobel, or another type of edge detection.

In a step 1014, an extraction of edgelets is performed. Once the edges have been detected in step 1013 and are available, at least some of the edges are joined together to form straight lines. Methods such as a Hough transform, RANSAC based line fitting methods, and other fitting methods can be used.

Steps 1013 and 1014 together allow for an extraction of 2D features of the object from the first image when the first pose is verified. These 2D features may include the edges, the edgelets, some combination thereof, and/or virtual interest points, as described further herein.

Once the edges are detected and the edgelets are extracted, virtual interest points (VIP) and constellations are detected, as shown in 1015. As an example, an intersection of two or more edgelets will result in a unique point that may be a corner point but may otherwise be any intersecting point. Such a point may be a VIP. Other VIPs are also possible.

Each VIP is composed of two lines with known corners that form a triangle, the triangle corresponding to a constellation. That is, a constellation is a triangle that is comprised of two lines of the VIP with known corners.

In the output step 1020, a training dataset containing the extracted 2D features, including some or all of the edges, edgelets, VIPs and constellations, is stored along with the corresponding first pose in one or more memories that stored the image data sequence or another one or more memories. The descriptors of each VIP will be stored in such memories for training purposes. The descriptor may be an ORB, BRIEF, or SURF or other descriptor.

Further, each constellation will be stored in such memories. In some embodiments, the constellations are each represented by a hash key which is stored in the hash table while training. In some embodiments, the hash will be computed based upon angles and relative distanced between the lines in each constellation.

The output 1020 will be the output of the training method and will be used with respect to detection, as described in more detail below.

Referring to FIG. 10B, a detection phase is shown. The detection phase may occur in a situation whereby tracking has been lost. That is, a pose lost state of the object pose tracking algorithm may occur. This may occur during a tracking of the object that is subsequent to the initial training of the object described with respect to FIG. 10A.

A goal of the detection phase in FIG. 10B may be to derive a second pose of the object using a second image of the image data sequence and the training dataset in the one or more memories or the other one or more memories when the pose lost state is determined.

Initially, during input step 1030, once the pose lost state is determined, the method includes providing an input, during input step 1030. The input may be an input of a raw image, corresponding to the object or an environment having the object, without any additional information.

Subsequent to the input step 1030, an online detection step 1040 is performed. The online detection module 1040 is described in further detail with respect to FIG. 11.

The detection step 1040 may begin by an image brightness and contrast adjustment, similar to step 1012 in FIG. 10A. Subsequently, edges and edgelets may be extracted similar to step 1013 and 1014 in FIG. 10A. Virtual interest points and constellations may be determined similar to step 1015 in FIG. 10A. The details of such extractions and determinations are thus not repeated herein.

Once the constellations are determined during the detection step 1040, a view matching sequence, which still may be a part of the detection step 1040, is begun. Upon completion of the detection, discussed with more detail with respect to FIG. 11 below, an output 1050 is generated. The output 1050 includes detection of the object with an acquired second pose from the detection step 1040. The second pose is then sent to a tracker.

Referring to FIG. 11, a view matching system in the detection pipeline is shown. FIG. 11 first shows a step 1101 of an LSD detector for keylines. Step 1102 is a step of computing the VIPs similar to step 1115 in FIG. 10A. Step 1103 is determination of a descriptor, represented as an ORB descriptor. However, the descriptor may be ORB, BRIEF, SURF or another descriptor similar to the descriptor in the output step 1020 described with FIG. 10A.

Next, a view matching step 1110 occurs. Within the view matching, a step 1111 involves searching the hash table for any constellation matches. That is, the method may involve comparing a generated constellation from the detection phase in step 1040 of FIG. 10B to a constellation generated and stored in the hash table from step 1020 of FIG. 10A. The constellation matches can include any physical match of constellations or any match whereby the descriptors representing each constellation are considered to be a match.

After the hash table is searched for constellation matches, the view matching step 1110 includes a step 1112 of training and testing the image keypoint. This may include training procedures similar to those described with respect to FIG. 10A.

In step 1113, a verification is performed. As an example, a hamming distance between ORB descriptors of constellations may be checked to determine whether a match is appropriate. If other descriptors such as BRIEF or SURF are used, a similar descriptor check may occur. A further verification may be performed within step 1114 to verify an intensity difference of potential matching constellations.

In step 1115, any pairs of constellations that are considered a match are output as a trained view that passed both verifications, and in step 1116, a histogram count is updated for each trained view. The procedure for steps 1111-1116 is repeated for every constellation in the test image to determine a best view.

After each constellation is run through the view matching 1110, top hypotheses, which, for example, are the most similar trained views for the test image, are output in step 1120, and such views will have their keypoints matched in a keypoint matching step 1130.

The keypoint matching step 1130 is used to ultimately derive the second pose of the object using a second image of the image data sequence and the training dataset in the one or more memories or the other one or more memories when the pose lost state is determined. That is, the keypoint matching step 1130 first extracts all key points of the best matched views from step 1120. These keypoints in the trained images and test images are sent to a matcher in step 1131, and keypoint pairs are tested. An optional step 1132 of checking a perspective transformation error may occur.

In step 1133, a number of matched keypoint pairs is checked. For example, inlier matches (e.g., matches fitting the model or those whose distribution can be explained by a set of model parameters) are determined.

In step 1134, the matched keypoint pairs that are considered the inliers are sent to a pose estimation algorithm to determine the second pose. As an example, in some embodiments, RANSAC PNP, which may be robust to outliers, and can thus withstand the noisy matches, is used. Another PNP system may be used.

In a step 1135, a verification of the pose may occur. A region of interest (ROI) of the pose may be extracted in step 1135, and in step 1136, a verification that this ROI is valid and within the image may occur. A further verification in step 1137 may include verifying that the ROI is larger than, for example, 30×30 or 60×60. The verification may be geometric or shape-based and/or appearance based.

Figure 12A:
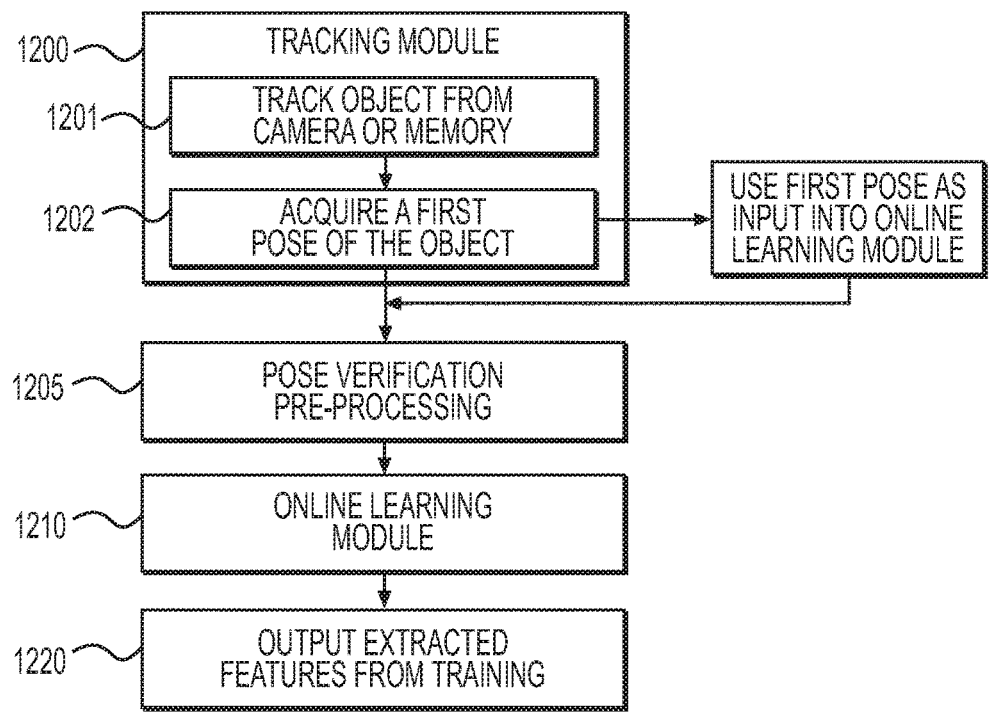
FIG. 12A is a flow diagram of a method of training according to an embodiment.
Figure 12B:
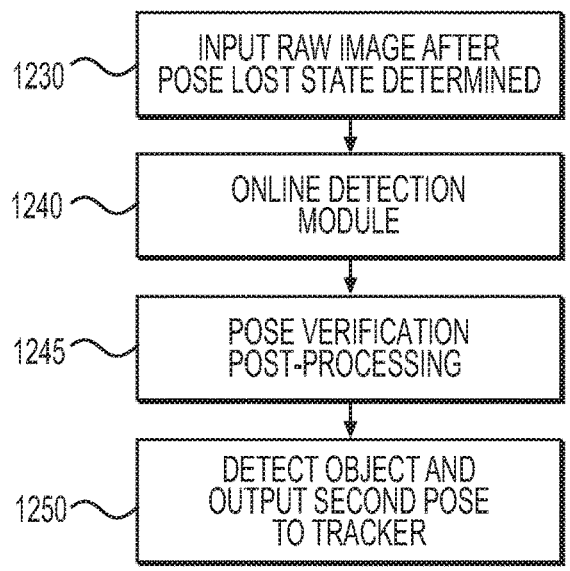
FIG. 12B is a flow diagram of a method of detecting according to an embodiment.

FIGS. 12A and 12B shows a flow diagram of another embodiment. The embodiment of FIGS. 12A and 12B is similar to the embodiment of FIGS. 10A and 10B and reference is made to FIGS. 10A and 10B as appropriate for brevity.

As in step 1000 in FIG. 10A, FIG. 12A includes a corresponding input step 1200 of the tracker pose. Additionally included prior to the view training step 1210 is a pre-processing step 1205 of pose verification. This may be done offline or online, and may be done before the online training. The pose verification may be similar to steps 1011 and/or 1012 in FIG. 10A, but may be executed as a separate pre-processing step before any online training method begins.

The view training step 1210 may be an online learning module and may be similar to step 1010 of FIG. 10A but may not include a pose verification step and/or an image brightness and a contrast adjustment step if such steps are performed within the pre-processing 1205. Further, such steps may be omitted entirely in some embodiments.

Output step 1220 may be similar to step 1020 in FIG. 10A and details are thus omitted.

The detection processing in FIG. 12B may include an input 1230 which is similar to step 1030 in FIG. 10A. The processing may further include a detection method 1240 similar to step 1040 in FIG. 10A and includes similar processing to that of FIG. 11, and may also include object pose estimation from an online learning system. There may exist a separate pose verification step within post processing step 1245 prior to the output of the detected pose 1250. Step 1245 may be executed as a separate step outside of the online detection, but may be otherwise include verification similar to that described within step 1113 in FIG. 11.

Figure 13:
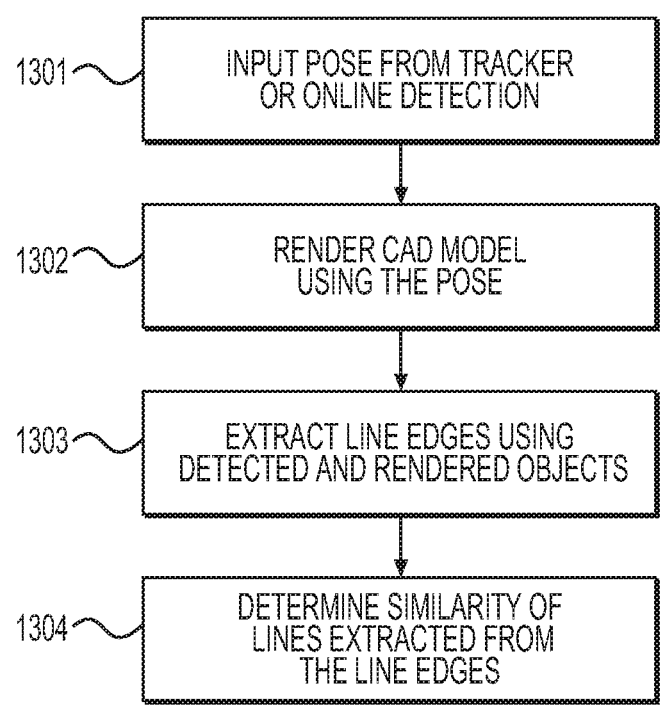
FIG. 13 is a flow diagram of pose verification according to an embodiment.

FIG. 13 shows a pose verification procedure according to an embodiment. The pose verification may be similar to the verification described with reference to step 1134 as described with respect to FIG. 11, but may include additional or alternative features.

In online learning generally and particularly in online training and online detection, it is advantageous to check an accuracy of trained poses so as to improve the accuracy of detected poses. Therefore, pose verification may be advantageous as a preprocessing step for training as described with reference to FIG. 12A, and a post processing step for detection as described with reference to FIG. 12B.

A further method for pose verification uses shape features that mostly include edges. For texture-less or weakly textured objects, edges are a consistent feature. Thus, edges are useful for verification of the pose.

In a step 1301, the pose from online detection (e.g., as shown in FIGS. 10B, 11, and 12B) or a pose tracked by a tracker is input. In a step 1302, a CAD model is rendered using the pose. Then, in step 1303, the line edges are extracted using the detected object and rendered objects. This may include passing the object in the detected view and the rendered CAD model through an edge detector.

In some embodiments, weak and strong edges may be used to extract lines, given that edges can be weak in low contrast areas. In still some embodiments, at least one pair of lines that are orthogonal to each other in one image may be used as a constraint to find a corresponding pair in the other image, and the number of such pair of the lines is preferably two or more for even stabler matching.

In a step 1304, a determination of the similarity of the lines may be made and a decision as to whether the pose is correct may be made. This may be based upon whether the lines are similar.

For example, in step 1304, the lines of the detected view and the rendered CAD model are compared, with a similarity score generated based on a distance and angles between detected lines of both detected and rendered object. Further, the pose may be considered correct if the similarity score is within a predetermined amount and there are at least two pairs of lines that are orthogonal to each other that are in the set of similar lines.

While the description of steps 1301-1304 describes verification of the second pose in the detection phase, similar steps may be used to verify the first pose during the training phase.

As will be appreciated by one skilled in the art, aspects of the present invention may be embodied as a system, method or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the presently described embodiments. The following claims are in no way intended to limit the scope of embodiments to the specific embodiments described herein.

What is claimed is:

1. A non-transitory computer readable medium storing instructions to cause one or more processors to:
    acquire, from a camera or one or more memory storing an image data sequence captured by the camera, the image data sequence containing images of an object in a scene along time;
    track a pose of the object through an object pose tracking algorithm;
    during the tracking of the pose of the object, acquire a first pose of the object in a first image of the image data sequence, the first pose being a result of tracking a pose of the object through the object pose tracking algorithm;
    during the tracking of the pose of the object, extract 2D edgelets of the object from the first image, the edgelets extracted by joining together at least some edges of the object using a fitting method;
    determine a plurality of virtual interest points based upon the extracted edgelets;
    determine a constellation of the virtual interest points; and
    store a training dataset containing the extracted 2D edgelets, the virtual interest points, the constellation, and the corresponding first pose together in the one or more memories or other one or more memories.

2. The non-transitory computer readable medium according to claim 1, wherein the instructions further cause the one or more processors to:
    determine a pose lost state of the object pose tracking algorithm; and
    derive a second pose of the object using a second image of the image data sequence and the training dataset in the one or more memories or the other one or more memories when the pose lost state is determined.

3. The non-transitory computer readable medium according to claim 2, wherein the deriving the second pose includes a step of comparing extracted 2D features from the second image to the extracted 2D features of the object from the first image.

4. The non-transitory computer readable medium according to claim 2, wherein the instructions further cause the one or more processors to:
    verify the second pose using an appearance-based and/or geometric-based verification.

5. The non-transitory computer readable medium according to claim 4, wherein the second pose is verified by comparing edges of the second pose to edges from a CAD model rendered using the detected pose.

6. The non-transitory computer readable medium according to claim 1, wherein the instructions further cause the one or more processors to, determine an image brightness and/or contrast and adjust the image brightness and/or contrast to a predetermined level prior to extracting the 2D features.

7. The non-transitory computer readable medium according to claim 1, wherein the instructions further cause the one or more processors to determine at least one virtual interest point from the extracted 2D features.

8. The non-transitory computer readable medium according to claim 1, wherein the instructions further cause the one or more processors to determine a plurality of virtual interest points based upon the extracted 2D features.

9. The non-transitory computer readable medium according to claim 1, wherein the instructions further cause the one or more processors to:
compare 2D features extracted during an extraction of 2D features of the object from a second image to the extraction of 2D features of the object from the first image.

10. The non-transitory computer readable medium according to claim 9, wherein the instructions further cause the one or more processors to:
determine a matching view based upon the comparison, and matching key points from the matching view.

11. The non-transitory computer readable medium according to claim 10, wherein the instructions further cause the one or more processors to:
determine inlier matches from the matching view; and
performing a processing on the inlier matches to thereby derive a second pose.

12. A non-transitory computer readable medium storing instructions to cause one or more processors to:
acquire, from a camera or one or more memory storing an image data sequence captured by the camera, the image data sequence containing images of an object in a scene along time;
acquire a first pose of the object in a first image of the image data sequence, the first pose being a result of tracking a pose of the object through an object pose tracking algorithm;
verify the first pose;
extract 2D edgelets of the object from the first image when the first pose is verified, the edgelets extracted by joining together at least some edges of the object using a fitting method;
determine a plurality of virtual interest points based upon the extracted edgelets;
determine a constellation of the virtual interest points; and
store a training dataset containing the extracted 2D edgelets, the virtual interest points, the constellation and the corresponding verified first pose together in the one or more memories or other one or more memories.

13. The non-transitory computer readable medium according to claim 12, wherein the verifying of the first pose is performed during an online training.

14. The non-transitory computer readable medium according to claim 12, wherein the verifying of the first pose is performed offline prior to an online training.

15. A method comprising:
acquiring, from a camera or at least one memory storing an image data sequence captured by the camera, the image data sequence containing images of an object in a scene along a time;
acquiring a first pose of the object in a first image of the image data sequence, the first pose being a result of tracking a pose of the object through an object pose tracking algorithm;
verifying the first pose;
extracting of 2D edgelets of the object from the first image when the first pose is verified, the edgelets extracted by joining together at least some edges of the object using a fitting method;
determining a plurality of virtual interest points based upon the extracted edgelets;
determining a constellation of the virtual interest points; and
storing a training dataset containing the extracted 2D edgelets, the virtual interest points, the constellation, and the corresponding verified first pose together in the one or more memories or other one or more memories.

* * * * *